United States Patent
Hutsler et al.

(10) Patent No.: US 12,090,954 B2
(45) Date of Patent: Sep. 17, 2024

(54) AUTONOMOUS VEHICLE DELIVERY SERVICE AUTHENTICATION

(71) Applicants: AT&T Intellectual Property I, L.P., Atlanta, GA (US); Interwise Ltd., Airport City (IL)

(72) Inventors: Molly A. Hutsler, Gainesville, GA (US); Itiel Maayan, Shoham (IL)

(73) Assignees: AT&T Intellectual Property I, L.P., Atlanta, GA (US); Interwise Ltd., Ben-Gurion Airport (IL)

( * ) Notice: Subject to any disclaimer, the term of this patent is extended or adjusted under 35 U.S.C. 154(b) by 0 days.

(21) Appl. No.: 18/045,291

(22) Filed: Oct. 10, 2022

(65) Prior Publication Data

US 2024/0116476 A1   Apr. 11, 2024

(51) Int. Cl.
| | |
|---|---|
| *B60R 25/24* | (2013.01) |
| *B60R 25/01* | (2013.01) |
| *G06Q 10/083* | (2023.01) |

(52) U.S. Cl.
CPC .......... *B60R 25/241* (2013.01); *B60R 25/01* (2013.01); *G06Q 10/083* (2013.01)

(58) Field of Classification Search
CPC ...... B60R 25/241; B60R 25/01; G06Q 10/083
See application file for complete search history.

(56) References Cited

U.S. PATENT DOCUMENTS

| | | | |
|---|---|---|---|
| 10,514,690 B1* | 12/2019 | Siegel | G05D 1/0027 |
| 2004/0199284 A1* | 10/2004 | Hara | G07F 17/13 |
| | | | 700/215 |
| 2017/0236092 A1* | 8/2017 | High | G06Q 10/08355 |
| | | | 705/338 |
| 2017/0262709 A1* | 9/2017 | Wellington | G06V 10/764 |
| 2017/0344998 A1* | 11/2017 | Kohli | H04W 76/10 |
| 2018/0074495 A1* | 3/2018 | Myers | B60K 28/06 |
| 2019/0049988 A1* | 2/2019 | Meij | G06Q 50/12 |
| 2019/0137287 A1* | 5/2019 | Pazhayampallil | G05D 1/0291 |
| 2019/0322504 A1* | 10/2019 | Raab | G05D 1/028 |
| 2019/0392370 A1* | 12/2019 | Kashi | B64C 39/024 |
| 2020/0050978 A1* | 2/2020 | Perez Barrera | G06Q 50/40 |
| 2020/0218281 A1* | 7/2020 | Ono | G06Q 10/0833 |
| 2021/0295242 A1* | 9/2021 | Rathi | G06Q 10/083 |

* cited by examiner

*Primary Examiner* — Thomas D Alunkal
(74) *Attorney, Agent, or Firm* — Guntin & Gust, PLC; Douglas Schnabel

(57) ABSTRACT

Techniques are described that facilitate authenticating and verifying pick-ups and deliveries associated with an autonomous vehicle delivery service. In one example embodiment, a method comprises accessing, by a system comprising a processor, authentication information associated with a target physical location, wherein the authentication information comprises network access information for a communication network associated with the target physical location. The method further comprises verifying, by the system, whether a current location of an autonomous vehicle corresponds to the target physical location based on an ability of a communication device of the autonomous vehicle to establish a network connection with the communication network using the network access information.

20 Claims, 10 Drawing Sheets

AUTONOMOUS VEHICLE DELIVERY SERVICE AUTHENTICATION

TECHNICAL FIELD

This disclosure relates to techniques for authenticating and verifying pick-ups and deliveries associated with an autonomous vehicle delivery service.

BACKGROUND

Large and small businesses need affordable, reliable, and swift ways to deliver products to customers. The challenge for the consumer is identifying who delivers, because many local businesses do not deliver, and the challenge for businesses is providing reliable delivery services at reasonable cost.

DETAILED DESCRIPTION

Figure 1:
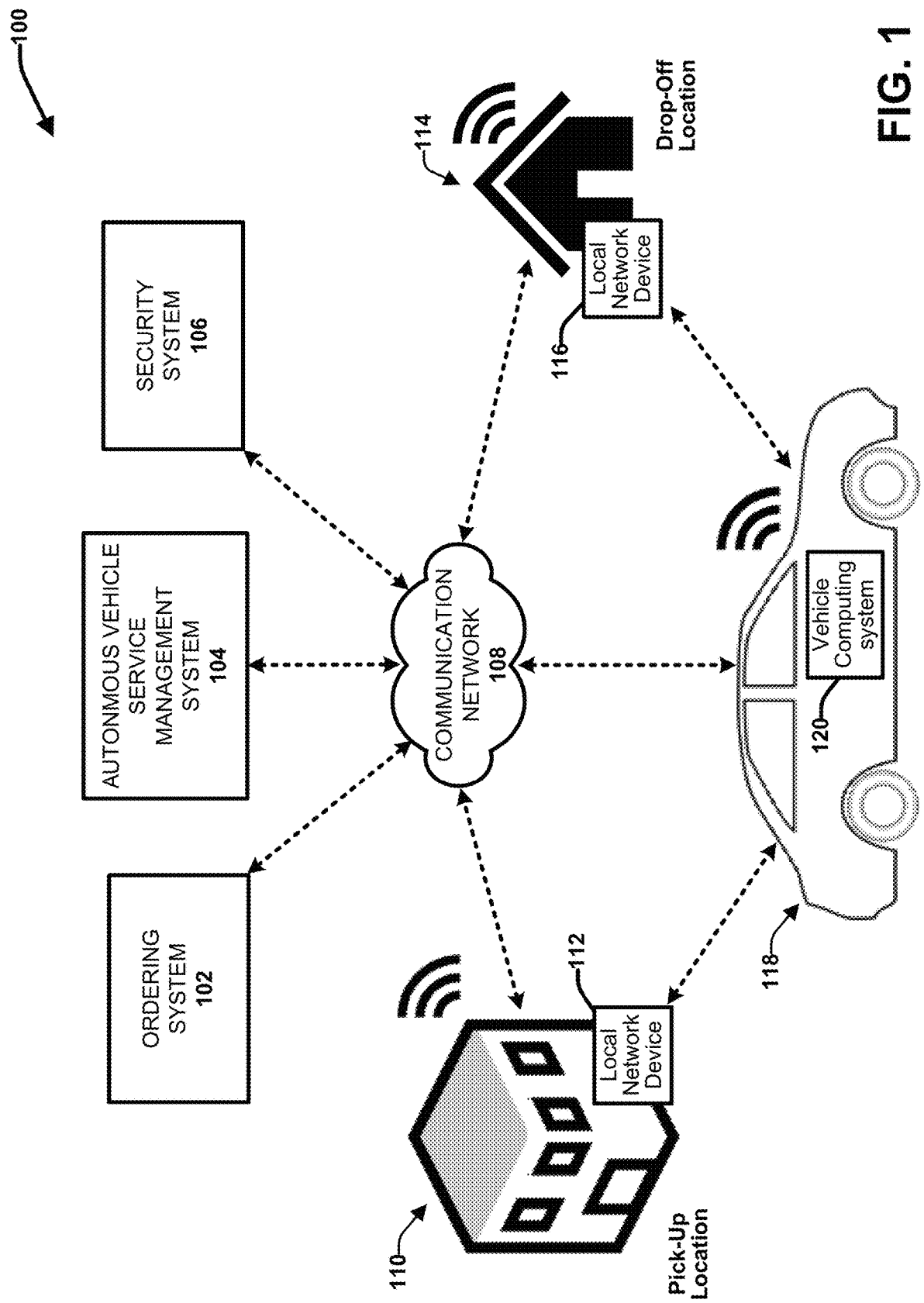
FIG. 1 illustrates an example, non-limiting system that facilitates authenticating and verifying pick-ups and deliveries associated with an autonomous vehicle delivery service in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, or in this Detailed Description section.

The disclosed subject matter is directed to techniques for authenticating and verifying pick-ups and deliveries associated with an autonomous vehicle delivery service. The autonomous vehicle delivery service can provide for delivery of goods, and in some implementations people, in an automated manner using autonomous vehicles, such as autonomous automobiles (e.g., cars, vans, trucks, etc.), autonomous drones, and other types of autonomous vehicles. An autonomous vehicle is a self-operating vehicle capable of sensing its environment and operating without human involvement. A human operator is not required to take control of the vehicle at any time, nor is a human passenger required to be present in the vehicle at all. In this regard, an autonomous car can go anywhere a traditional car goes and do everything that an experienced human driver does.

By eliminating the need for human delivery drivers, the autonomous vehicle delivery service significantly reduces costs attributed to conventional shipping and delivery systems. However, one of the challenges associated with an automated delivery process using autonomous vehicles involves ensuring the vehicle arrives at the correct pick-up and drop-off locations associated with the delivery orders. In this regard, the disclosed subject matter assumes the autonomous vehicles are capable of self-navigating to a specific geographical location defined by a specific geographical address associated with respective pick-up and drop-off locations defined for a delivery order using global positioning system (GPS) technology and/or other existing navigation/positioning technology. However, depending on the particular geographical area associated with delivery, the level of accuracy associated with GPS technology and/or other existing navigation/positioning systems can vary. For example, in association with navigating to a specific physical location defined by a specific physical address, the GPS may position the vehicle near the correct location corresponding to the physical address yet between two or more potential storefronts or houses, wherein only one of which correspond to the correct pick-up or drop-off location. In order to provide a reliable automated delivery service, confirmation of pick-up and delivery at the correct location is demanded.

The disclosed subject matter addresses this challenge by providing automated techniques for verifying the correct autonomous vehicle has arrived at the correct location/place for picking-up and dropping off a product (or any item or person) associated with a delivery order. In one or more embodiments, the disclosed solution involves verifying that an autonomous vehicle has arrived at the correct target location (e.g., a target pick-up location and/or a target drop-off location) based on an ability of the autonomous vehicle to establish a wireless connection with the local, private wireless network associated with the target location using the corresponding private access information for the local private wireless network (e.g., the local, private Wi-Fi network name and password). For example, once the autonomous delivery vehicle arrives to the gate/home/business location, the vehicle joins to the corresponding local Wi-Fi network of the gate/home/business for verification that vehicle has arrived at the accurate location. The autonomous vehicle can access or otherwise receive the corresponding private access information (e.g., the local, private Wi-Fi network name and password) for the local private wireless network in association with reception of a delivery order, registration of respective users associated with the corresponding locations and private networks with the delivery service and/or in other secure manners. In some embodiments, based on verification that the autonomous vehicle has arrived at the correct pick-up or drop-off location, various automated actions associated with the delivery service can be initiated, such as unlocking/opening the vehicle for allowing placement of a product within for delivery and/or removing a product delivered, notifying the consumer regarding arrival, and others.

In some embodiments, in addition to verifying the correct location of the autonomous delivery vehicle based on successful connection of the vehicle to the target location's local private network, the disclosed techniques provide for multi-factor authentication of the correct vehicle and target location. For example, the additional authentication factors can be based on performance of an authentication procedure between the vehicle and the local network gateway device at the target location using a private key exchange, wherein the private keys required for the authentication can be provided to the vehicle in a secure manner. In some implementations of these embodiments, the private keys can be tied to a specific order and expire after a defined time frame. In another example, the autonomous vehicle can confirm arrival at the correct target location based on a determination that a unique identifier for the local network device (e.g., the local gateway device unique identifier) corresponds to the correct device identifier provided to the vehicle for the target location. In another example, the autonomous vehicle can confirm arrival at the correct target location based on an ability to communicate with and/or remotely control a local device at the target location once connected to the local network for the target location, such as an Internet of things (IoT) device connected to the local network (e.g., a smart home device such as ringing an IoT doorbell or the like). In another implementation, the autonomous vehicle can capture image data at its current location and compare the image data with reference image data for the target location (e.g., a picture of the home/storefront) to determine whether there is a correct match using image processing technology. In various embodiments, the consumer can define the specific authentication factor or combination of factors required for a specific target location and/or order. Since no person will be part of delivery, the multifactor confirmation of the solution described above guarantees accurate delivery of products.

To facilitate this end, in an example embodiment, a device located on or within an autonomous vehicle is provide that comprises a processor and a memory that stores executable instructions that, when executed by the processor, facilitate performance of operations. The operations can comprise, accessing authentication information associated with a target physical location, wherein the authentication information comprises network access information for a communication network associated with the target physical location. The operations further comprise verifying whether a current location of the autonomous vehicle comprising the device corresponds to the target physical location based on an ability of the device to establish a network connection with the communication network using the network access information. In some implementations, the operations further comprise controlling physical access to the autonomous vehicle based on a result of the verifying (e.g., opening the vehicle based on successful verification and refraining from opening the vehicle based on unsuccessful verification).

In some aspects, the target physical location is associated with a pick-up location for a pick-up of a product, and wherein the accessing is based on reception of an order for the product to be picked up by the autonomous vehicle. Based on a result of the verifying being that the current location of the autonomous vehicle corresponds to the target physical location, the operations can further comprise enabling physical access to an area that is part of the autonomous vehicle for placement of the product in connection with the pick-up of the product. For example, the physical area may include any internal compartment of the vehicle, a designated area of the vehicle, a specific locker unit or compartment of the vehicle to which the only the parties involved in the order are given access, or the like.

In other aspects, the target physical location corresponds to a drop-off location for a drop-off of a product, and wherein the accessing is based on reception of an order for the product to be delivered to the drop-off location by the autonomous vehicle. Based on a result of the verifying being that the current location of the autonomous vehicle corresponds to the target physical location, the operations can further comprise enabling physical access to an area that is part of the autonomous vehicle comprising the product in connection with the drop-off of the product.

In some embodiments, the authentication information further comprises additional criterion information that identifies one or more additional verification criterion associated with the target physical location, and wherein the verifying is further based on whether the one or more additional verification criterion is satisfied. In some implementations, satisfaction of the one or more additional verification criterion comprises an authentication of a gateway device associated with the target physical location using private key data for the gateway device included in the authentication information. In other implementations, satisfaction of the verification criterion comprises a successful completion of an authentication protocol between the device and a gateway device associated with the target physical location using private key data for the gateway device included in the authentication information (e.g., a bi-directional authentication). In other implementations, the authentication information comprises reference image data associated with the target physical location, and wherein satisfaction of the one or more additional verification criterion comprises determining there is a match between the reference image data and current image data captured at the current location by the autonomous vehicle.

In various embodiments, satisfaction of the one or more additional verification criterion varies for different target physical locations comprising the target physical location and/or based on a first characteristic of the order or a second characteristic of an entity associated with the order. In this regard, different users (e.g., business owners and/or customers) can define and control the security parameters associated with usage of the delivery service which can involve different levels of security (e.g., a basic level or a stricter level) based on preferences of the users, cost/sensitivity of the product or products associated with an order or another factor.

Embodiments of systems and devices described herein can include one or more machine-executable components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions (and other described herein) can be stored in memory associated with the one or more machines. The memory can further be operatively coupled to at least one processor, such that the components can be executed by the at least one processor to perform the operations described. In some embodiments, the memory can include anon-transitory machine-readable medium, comprising the executable components or instructions that, when executed by a processor, facilitate performance of operations described for the respective executable components. Examples of said and memory and processor as well as other suitable computer or computing-based elements, can be found with reference to FIG. 10 (e.g., processing unit 1004 and system memory 1006 respectively), and can be used in connection with implementing one or more of the systems or components shown and described in connection with FIG. 1, or other figures disclosed herein.

In some embodiments, elements described in connection with the disclosed systems and devices can be embodied in different forms such as a computer-implemented method, a computer program product, or another form.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates an example, non-limiting system 100 that facilitates authenticating and verifying pick-ups and deliveries associated with an autonomous vehicle delivery service in accordance with one or more embodiments of the disclosed subject matter. System 100 includes various systems and devices that are communicatively coupled via a communication network 108 (e.g., a wide-area network (WAN) such as the Internet, a cellular network, and the like). The systems include ordering system 102, autonomous vehicle service management system 104, security system 106 and vehicle computing system 120 of an autonomous vehicle 118. The devices include local network devices (e.g., local network device 112 and local network device 116) respectively associated with real-world physical locations that can correspond to a pick-up location 110 for picking up a product (or a person) by the autonomous vehicle 118 and a drop-off location for dropping off the product.

In various embodiments, the ordering system 102 can correspond to an online ordering service associated with one or more merchants that provide products for purchasing by customers, wherein the products are available for pick-up at real world physical locations associated with the respective merchants, such as brick and mortar stores, storage warehouses, or the like. For example, in some implementations, the ordering system 102 can correspond to an ordering system associated with a single merchant or business, wherein customers can place orders for products provided by the merchant or business to be delivered by an autonomous vehicle delivery service. In other implementations, the ordering system 102 can correspond to an ordering system associated with a plurality of different merchants, wherein customers can select a particular merchant providing a desired product, purchase the product and have the product delivered by an autonomous vehicle delivery service. Various other configurations are envisioned. The types of the merchants and the products can vary and can include any type of merchant having one or more real-world physical locations (e.g., stores, buildings, warehouses, personal homes, etc.) where the products can be picked-up by an autonomous vehicle 118. For example, the merchants may include grocery stores, local businesses providing various goods (e.g., clothes, home goods and electronics, art supplies, building supplies, etc.) local restaurants, and the like. However, the disclosed techniques are not limited to shipping and delivery of products purchased from merchants. In this regard, it should be appreciated that the disclosed techniques can be applied in association with usage of an autonomous vehicle delivery service to pick-up essentially any item, person or thing from one place/location and drop-off the item, person or thing at another place/location. In this regard, the ordering system 102 can correspond to essentially any ordering system that can receive orders for picking up and dropping off items/thing and/or people between two or more real world physical locations to be fulfilled by an autonomous vehicle delivery service.

The autonomous vehicle service management system 104 can correspond to a network accessible management system of an autonomous vehicle delivery service. In this regard, the autonomous vehicle delivery service can be associated with an entity that has a fleet of autonomous vehicles (e.g., autonomous vehicle 118) available for usage in association with delivering picking up and dropping off items/thing and/or people between two or more real world physical locations. The type of the autonomous vehicles can vary. For example, the autonomous vehicles can include autonomous automobiles, autonomous aircraft (e.g., drones, planes, blimps, etc.), autonomous watercraft (e.g., autonomous boats, ships, hovercraft, etc.) and other types of autonomous vehicles. In this regard, it should be appreciated that although the autonomous vehicle 118 shown in system 100 is depicted as a car, it should be appreciated that the autonomous vehicle 118 may corresponds to a drone, a watercraft or another type of autonomous vehicle.

In various embodiments, merchants associated with the ordering system 102 can employ the autonomous vehicle delivery service to deliver products purchased at their stores to customers. For example, in association with placing an order for a product provided by a merchant via the ordering system 102, a customer can request the product to be delivered to a desired delivery location (e.g., a home address or the like) by the autonomous vehicle delivery service. The merchant can in turn employ the autonomous vehicle delivery service to perform the delivery. For example, the ordering system 102 can provide the delivery order to the autonomous vehicle service management system 104, wherein the delivery order identifies the pick-up location address (e.g., the address of pick-up location 110 for instance where the product is to be picked up), the product or product order (e.g., an order number or the like) to be picked up, and the drop-off location address (e.g., the address of drop-off location 114 for instance where the product is to be dropped off). The autonomous vehicle service management system 104 can thereafter schedule and manage the delivery order via one or more of their autonomous vehicles included in their fleet. For example, the autonomous vehicle service management system 104 can select and schedule an available autonomous vehicle 118 to perform the delivery order and provide the autonomous vehicle 118 with the delivery order instructions, wherein the instructions can identify at least the pick-up location address (e.g., the address of pick-up location 110 for instance where the product is to be picked up), the product or product order (e.g., an order number or the like) to be picked up, and the drop-off location address (e.g., the address of drop-off location 114 for instance where the product is to be dropped off).

In one or more embodiments, the security system 106 can provide a security solution employable by the autonomous vehicle service management system 104 to facilitate ensuring that the correct autonomous vehicle has arrived at the correct location/place for picking-up and dropping off a product (or any item or person) associated with a delivery order. In some embodiments, the security solution can be provided in the form of security software program or application executed by the security system 106 and accessed by the autonomous vehicle service management system 104 as a software as a service (SaaS) via a corresponding API for the security system 106. Additionally, or alternatively, the security solution can be purchased or licensed from the security system 106 by the autonomous vehicle service management system 104 and executed by the autonomous vehicle service management system 104. Various alternative deployment scenarios are envisioned.

In one or more embodiments, the security solution involves verifying that an autonomous vehicle 118 has arrived at the correct target location (e.g., a target pick-up location and/or a target drop-off location) based on an ability of the autonomous vehicle to establish a wireless connection with the local, private communication network associated with the target location using the corresponding private access information for the local private communication network, such as the local, private network name and password. For example, once the autonomous vehicle 118 arrives at the target location address as determined using GPS technology and/or other suitable navigation/positioning technology, the vehicle can detect and identify (e.g., via suitable wireless communication technology hardware/software located on within the autonomous vehicle 118) the corresponding local communication network associated with the target location and establish a wireless connection with the local network device (e.g., local network device 112, local network device 116 and the like) using the local network private access information (e.g., the local network private password or the like). The vehicle computing system 120 can access or otherwise receive the corresponding private access information (e.g., the local, private Wi-Fi network name and password) for the local private communication network for a target pick-up location 110 and a target drop-off location 114 in association with scheduling/reception of a delivery order by the autonomous vehicle service management system 104, registration of respective users associated with the corresponding locations and private networks with the delivery service and/or in other secure manners. In this regard, in addition to determining that the vehicle has arrived at a target pick-up address or drop-off address using GPS technology and/or other conventional positioning/navigation technology, the vehicle computing system 120 can further verify that the current location of the vehicle corresponds to the correct target location based on whether the vehicle communication device can successfully detect and connect with the local private network for the target location.

In some embodiments, based on verification that the autonomous vehicle 118 has arrived at the correct pick-up or drop-off location, various automated actions associated with the delivery service can be initiated, such as unlocking/opening the vehicle for allowing placement of a product within for delivery and/or removing a product delivered, notifying the consumer regarding arrival, and others. The actions can be performed and controlled by the vehicle computing system 120 directly and/or remotely by the autonomous vehicle service management system 104 and/or the security system 106.

In some embodiments, in addition to verifying the correct location of the autonomous vehicle 118 based on successful connection of the vehicle (e.g., the vehicle's communication device) to the target location's local private network, the disclosed techniques provide for multi-factor authentication of the correct vehicle and target location. For example, the additional authentication factors can be based on performance of an authentication procedure between the vehicle computing system 120 and the local network device (e.g., local network device 112, local network device 116 and the like) at the target location using a private key exchange, wherein the private keys required for the authentication can be provided to the vehicle computing system 120 by the autonomous vehicle service management system 104 and/or the security system 106 in a secure manner. In some implementations of these embodiments, the private keys can be tied to a specific order and expire after a defined time frame. In another example, the autonomous vehicle computing system 120 can confirm arrival at the correct target location based on a determination that a unique identifier for the local network device (e.g., local network device 112, local network device 116, and the like) corresponds to the correct device identifier provided to the vehicle computing system 120 for the target location. In another example, the autonomous vehicle computing system 120 can confirm arrival at the correct target location based on an ability to communicate with and/or remotely control a local device at the target location once connected to the local network for the target location, such as an IoT device connected to the local network (e.g., a smart home device such as ringing an IoT doorbell or the like). In another implementation, the autonomous vehicle computing system 120 can capture image data at its current location and compare the image data with reference image data for the target location (e.g., a picture of the home, driveway, gate, mailbox, storefront, parking lot, etc.) to determine whether there is a correct match using image processing technology. In various embodiments, the consumer can define the specific authentication factor or combination of factors required for a specific target location and/or order. Since no person will be part of delivery, the multifactor confirmation of the solution described above guarantees accurate delivery of products.

In this regard, the local network device 112 and the local network device 116 can respectively correspond to local area network (LAN) gateway devices, access point devices and the like respectively located at the corresponding locations. The type of wireless communication technology employed by the local network devices at the target locations can vary and include any suitable wireless communication technology (e.g., cellular, Wi-Fi, BLUETOOTH®, near field communication (NFC) etc. In various embodiments, the local network device 112, the local network device 116 can communicatively couple one or more additional communication devices (e.g., local computer, smartphones, tablets, IoT devices, smart home devices, etc.) located at the correspond locations to one another using any suitable wireless and/or wired communication technology, thereby providing or establishing a LAN at the corresponding locations. The local network device 112, the local network device 116 and the like can further connect the respective LANs and connected local devices to the communication network 108 via any suitable wired or wireless communication technology (e.g., cellular, Wi-Fi, satellite, fiber, etc.).

As noted above, the type of the autonomous vehicle 118 can vary and is not limited to automobiles. The features and functionalities of the autonomous vehicle 118 can include conventional features and functionalities of corresponding autonomous vehicles in the field (e.g., conventional autonomous automobiles, conventional autonomous drones, conventional autonomous land robots, etc.). An autonomous vehicle is a self-operating vehicle capable of sensing its environment and operating without human involvement. In this regard, the autonomous vehicle 118 can include any vehicle capable of self-operation and self-navigation using corresponding technology. The vehicle computing system 120 can include and/or communicatively couple the various interconnected electromechanical systems and associated controllers of the autonomous vehicle 118. The vehicle computing system 120 can further include or be communicatively coupled to a communication device (e.g., communication hardware and software) located on or within the autonomous vehicle 118 capable of performing various wireless communication technology that enables wirelessly connecting the communication device to the local network devices (e.g., local network device 112, local network device 116 and the like) and the communication network 108.

Figure 2:
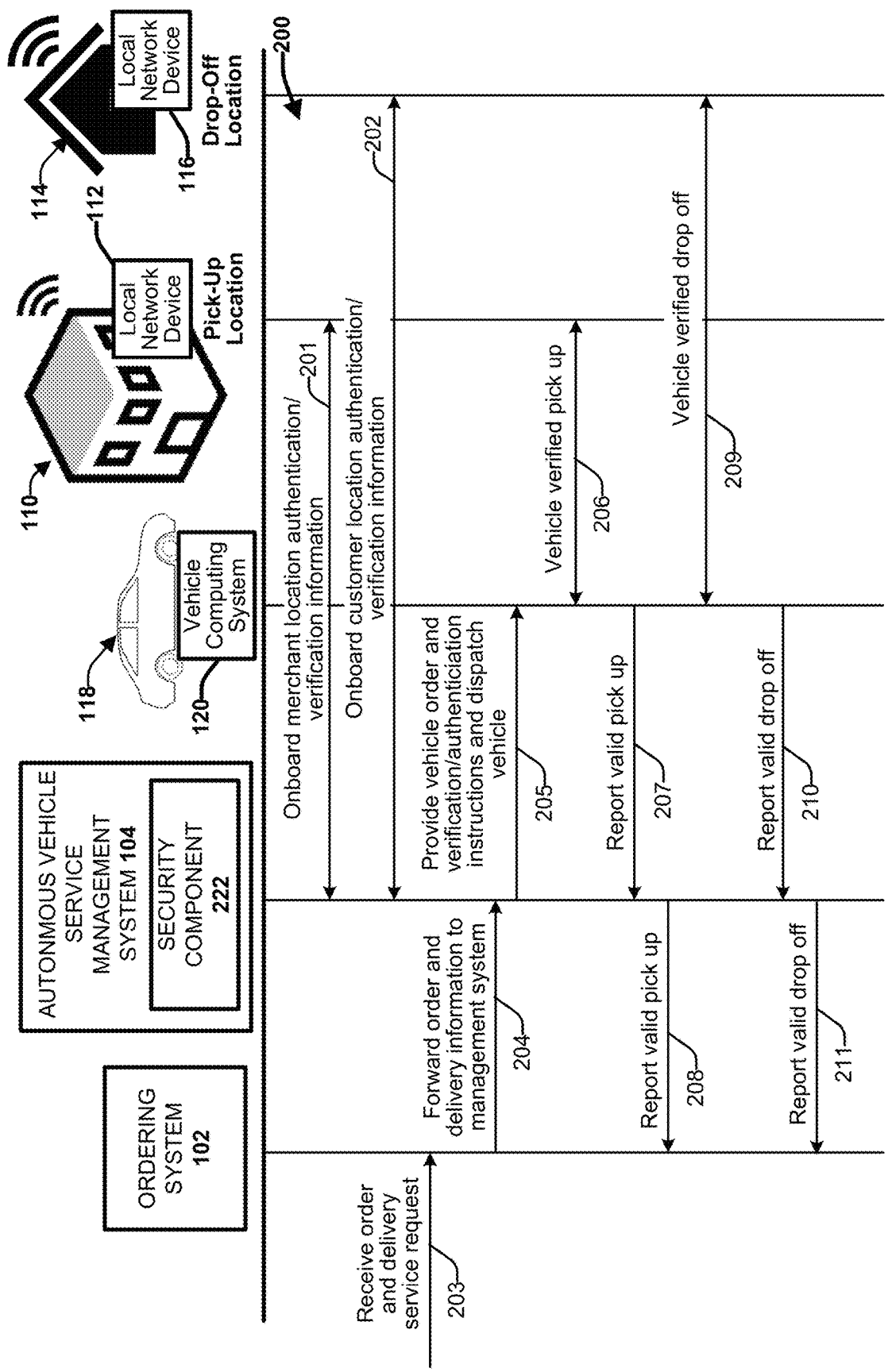
FIG. 2 illustrates a signaling diagram of an example process for authenticating and verifying pick-ups and deliveries associated with an autonomous vehicle delivery service in accordance with one or more embodiments of the disclosed subject matter.

FIG. 2 illustrates a signaling diagram of an example process 200 for authenticating and verifying pick-ups and deliveries associated with an autonomous vehicle delivery service in accordance with one or more embodiments of the disclosed subject matter. In accordance with the embodiment shown in FIG. 2, the autonomous vehicle service management system 104 can include security component 222 to facilitate the security aspects associated with authenticating and verifying pick-ups and deliveries associated with the autonomous vehicle delivery service managed by the autonomous vehicle service management system 204. In some implementations, the security component 201 can correspond to the security system 106 of system 100. In other implementations, the security component 222 can correspond to a software solution (e.g., an application/program) provided by the security system 106 to the autonomous vehicle service management system 104 as a purchased or licensed security product (e.g., as a downloaded product, or otherwise accessed by the autonomous vehicle service management system 104 at the security system 106 via a suitable API). Repetitive description of like elements employed in respective embodiments is omitted for sake of brevity.

Process 200 is exemplified in association with performing a delivery order involving picking up a product from pick-up location 110, wherein pick-up location 110 corresponds to a merchant store, and dropping off the product at drop-off location 114, wherein the drop-off location corresponds to the home of the customer that purchased/ordered the product from the merchant store. With reference to FIGS. 1 and 2, in accordance with process 200, at 201 the security component 222 can onboard the merchant location authentication/verification information to the autonomous vehicle service management system 104, and at 202 the security component 222 can onboard the customer location authentication/verification information to the autonomous vehicle service management system 104. Reference to onboarding the authentication/verification information data for a merchant location, a customer location, or any pick-up or drop-off location for that matter refers to receiving and storing relevant information for the corresponding location that is used to facilitate performing autonomous vehicle delivery services for the corresponding location in accordance with the disclosed authorization/verification techniques. In this regard, in accordance with process 200, the onboarding steps of process 200 correspond to a registration process that can be performed by the merchant and the customer with the autonomous vehicle service management system 104 prior to scheduling a delivery order. For example, the merchant and the customer can respectively register with the with the autonomous vehicle service management system 104 and establish corresponding accounts therewith with information that defines and controls authorizing/verifying pick-ups and deliveries at the respective locations by the autonomous vehicle delivery service. In other embodiments, the onboarding process can be performed by the merchant and/or the customer in association with scheduling a delivery order.

In association with onboarding the authentication/verification information at 201 and 202, the security component 222 can receive information identifying the physical addresses of the corresponding physical location associated with the merchant and the customer (e.g., the address of the merchant store and the address of the customer home) and the authentication/verification criteria and associated authentication data desired by the merchant and the customer for authenticating and verifying pick-ups and/or deliveries as the respective locations. In various embodiments, the authentication/verification criteria can include or require verifying a pick-up or delivery based on an ability of a communication device of the autonomous vehicle 118 to establish a wireless connection with the corresponding LAN (or local network device 112 and local network device 116 respectively) of the pick-up location 110 and the drop-off location 114. With these embodiments, the authentication/verification information onboarded at 201 and 202 can the private access information for the corresponding LANs of the respective locations, such as the LAN unique identifier (e.g., a name or the like) and password.

The authentication/verification information may also include additional authentication/verification parameters desired by the merchant and/or the customer for authenticating and verifying pick-ups and/or deliveries as the respective locations in accordance with the multi-factor authentication/verification embodiments. The additional authentication/verification parameters can include, define and/or control one or more additional criterion required to be satisfied in order to verify a pick-up or delivery by an autonomous vehicle at the corresponding locations. For example, in some implementations, the additional criterion can comprise verifying a unique device identifier for the local network device of the corresponding location (e.g., local network device 112, local network device 116 and the like). With these implementations, the authentication/verification information onboarded at 201 and/or 202 can include the unique device identifier and a request for the autonomous vehicle to verify a pick-up or drop-off at the location based on determination that the local network device with which it connects comprises the unique device identifier.

The additional criterion can also be based on successful performance of an authentication procedure between the vehicle computing system 120 and the local network device (e.g., local network device 112, local network device 116 and the like) at the target location using a private key exchange after establishment of a successful wireless connection between the vehicle onboard communication device and the corresponding local network device. With these implementations, the authentication/verification information may include the private keys required for the authentication procedure and/or a request to verify a pick-up or delivery at the corresponding location using the private key exchange authentication procedure. In this regard, at 201 and/or 202, the security component 222 can associate the private keys with the corresponding accounts and addresses of the pick-up location 110 and the drop-off location 114 and provide the respective local network devices with their private key or keys to be exchanged.

For example, in some embodiments, in association with the merchant location (e.g., pick-up location 110) registering with the autonomous vehicle service management system 104 (or reception of an order) and a request to apply the private key exchange authentication protocol for verifying pick-ups and/or drop-offs at the merchant location, the security component 222 can generate a unique pair of keys to be used between the autonomous vehicle and the local network device 112 for the authentication procedure. The unique pair of keys can include a first key to be used by the local network device 112 in association authorizing a pick-up or drop-off by an autonomous vehicle at the merchant location and second key to be used by the autonomous vehicle in association authorizing a pick-up or drop-off by an autonomous vehicle at the merchant location. With these embodiments, in association with scheduling the autonomous vehicle 118 to perform a pick-up (or drop-off) at the merchant location (e.g., at 205 or the like), the security component 222 can provide the autonomous vehicle 118 with the first key and the second key. The security component 222 can also provide the local network device 112 with the first key and the second key at some point prior to arrival of the autonomous vehicle at the merchant location (e.g., which can be in association with the onboarding and registration process at 201, in response to an order, or in another secure manner). Upon arrival of the autonomous vehicle at the merchant location for a pick-up and successful connection of the vehicle to the merchant location LAN (e.g., using the LAN identifier and password information provided to the vehicle at 205), the vehicle and the local network device 112 can further verify the pick-up based on a valid exchange of the keys over the local wireless network connection. For example, the local network device 112 can provide the autonomous vehicle 118 with the first key and the autonomous vehicle can determine that the vehicle is authorized to perform the pick-up based on the first key corresponding to the second key. Additionally, or alternatively, the autonomous vehicle 118 can provide the local network device 112 with the second key and the local network device 112 can determine that the vehicle is authorized to perform the pick-up based on the second key corresponding to the first key. The local network device 112 can further notify the vehicle regarding a determination that the vehicle is authorized to perform the pick-up based on the second key corresponding to the first key. It should be appreciated that although described with reference to the merchant location, a same or similar key exchange authorization process can be applied to any pick-up or drop-off location. In addition, in some implementations of these embodiments, the private keys can be tied to a specific order and expire after a defined time frame.

In another example, the autonomous vehicle computing system 120 can confirm arrival of the autonomous vehicle 118 at the correct target location based on an ability to communicate with and/or remotely control a local device at the target location once connected to the local network for the target location, such as an IoT device connected to the local network (e.g., a smart home device such as ringing an IoT doorbell or the like). With these embodiments, the authentication/verification information onboarded at 201 and/or 202 can include information that defines the specific local device and/or remote-control action to be initiated by the vehicle computing system 120 to successful verify a pick-up and/or a delivery at the corresponding location. In another implementation, the autonomous vehicle computing system 120 can capture image data at its current location and compare the image data with reference image data for the target location (e.g., a picture of the home, driveway, gate, mailbox, storefront, parking lot, etc.) to determine whether there is a correct match using image processing technology. With these implementations, the authentication/verification information onboarded at 201 and/or 202 can include the reference image data and a request that the vehicle verify a pick-up and/or delivery at the corresponding location based on a determined match between the reference image data and current image data captured at the corresponding location by the autonomous vehicle (e.g., via one or more cameras located on or withing the autonomous vehicle 118) at the time of arrival of the corresponding location.

In various embodiments, the consumer (i.e., the merchant associated with the pick-up location and the customer associated with the drop-off location) can define the specific authentication factor or combination of factors required for a specific target location and/or order.

At 203, the ordering system 102 can receive an order for a product provided by the merchant corresponding to pick-up location 110 and a delivery service request for the product to be delivered to the drop-off location 114. In this regard, the order can identify the address of the pick-up location 110, the product or product order number to be picked-up at the pick-up location, and the address of the drop-off location 114. Based on the order comprising a delivery service request, at 204, the ordering system 102 can forward the order information to the autonomous vehicle service management system 104 for fulfilment of the delivery service request. Based on reception of the delivery service request and the order information, the autonomous vehicle service management system 104 can select and assign or schedule an autonomous vehicle 118 to perform the delivery service for the order. For example, the system can select a suitable vehicle for performing the delivery service based on the current location of the vehicle being near the pick-up location 110, the vehicle having enough room to accommodate the product (or products) included in the order, the vehicle having enough fuel/battery level to perform the delivery based on the route and various other factors.

Once a vehicle has been selected and assigned to perform the delivery service order, at 205 the security component 222 provide the vehicle computing system 120 with the order information and the verification/authentication instructions for the pick-up location and 110 and the drop-off location 116 and dispatch the autonomous vehicle 118. For example, at 205 the autonomous vehicle service management system 104 can provide the vehicle computing system 120 with the pick-up address, the LAN name and password associated with the pick-up address and any other additional authentication/verification information for the pick-up address if required (e.g., key exchange data, local network device identifier data, reference image data, etc.), and informaiton identifying or indicating the product or product order to be picked up. Likewise, the autonomous vehicle service management system 104 can provide the vehicle computing system 120 with the drop-off address, the LAN name and password associated with the drop-off address and any other additional authentication/verification information for the drop-off address if required. The autonomous vehicle 118 can thereafter self-navigate to the pick-up location and the drop-off location addresses using GPS technology or the like.

At 206, the autonomous vehicle 118 can pick-up the product or products associated with the order from the pick-up location 110 based on arrival at the pick-up location and successful verification that the current location of the vehicle corresponds to the pick-up location using the authentication/verification information and/or associated protocol required for the pick-up location. In some embodiments, based on successful verification of the pick-up, the vehicle computing system 120 can notify an entity at the pick-up location (e.g., via a corresponding device associated with the entity) that the vehicle has arrived for the pick-up of a particular product or order number and include the product and/or order number in the notification. The entity may correspond to a user (i.e., a person at the store), a machine (e.g., a robot) or the like. Based on reception of the notification, the entity can proceed to place the product or products associated with the order on or within the vehicle. In some embodiments, the vehicle computing system 120 can open the vehicle for the placement of the product therein in response to successful verification. In some aspects, the product can be placed anywhere inside the vehicle. In other aspects, the autonomous vehicle 118 can include a plurality of locker units and the vehicle computing system 120 can assign the order a locker unit for placing the product and provide access only to the corresponding locker unit. Various other arrangements are envisioned. In association with verifying the pick-up and reception of the product, at 207, the vehicle computing system 120 can report the valid pick-up to the autonomous vehicle service management system 104 which in turn can report the valid pick-up to the ordering system 102 at 208. The vehicle can further navigate to the drop-off location 114 to perform the drop-off of the product.

At 209, the autonomous vehicle 118 can drop-off the product or products associated with the order at the drop-off location 114 based on arrival at the drop-off location and successful verification that the new current location of the vehicle corresponds to the drop-off location using the authentication/verification information and/or associated protocol required for the drop-off location. In some embodiments, based on successful verification of the drop-off location, the vehicle computing system 120 can notify an entity (e.g., a person at the home or the like) associated with the drop-off location (e.g., via a corresponding device associated with the entity) that the vehicle has arrived at the drop-off location to drop-off the particular product or order number. The vehicle computing system 120 can further open the vehicle for retrieving the product/order located therein in response to successful verification. In some aspects in which the product is included in a locker within the vehicle, the notification can identify the locker number and access code for the opening the locker. Various other arrangements are envisioned. The vehicle can further complete the delivery and report successful delivery based on detection of removal of the product from the vehicle at the drop-off location 116. In association with verifying the drop-off and delivery of the product, at 210, the vehicle computing system 120 can report the valid drop-off to the autonomous vehicle service management system 104 which in turn can report the valid drop-off to the ordering system 102 at 211.

Figure 3:
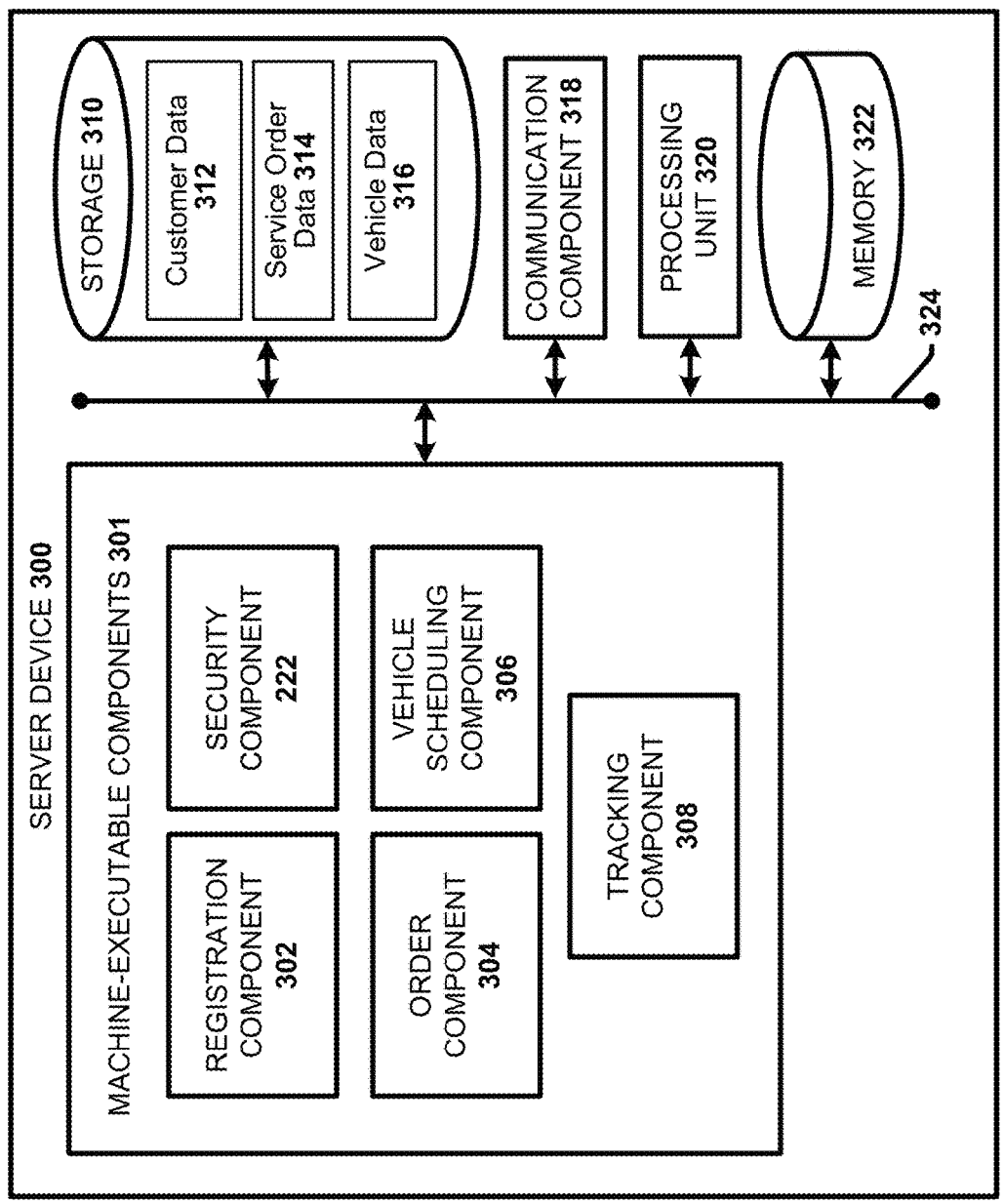
FIG. 3 illustrates a block diagram of an example, non-limiting server device that facilitates authenticating and verifying pick-ups and deliveries associated with an autonomous vehicle delivery service in accordance with one or more embodiments of the disclosed subject matter.

FIG. 3 illustrates a block diagram of an example, non-limiting server device 300 that facilitates authenticating and verifying pick-ups and deliveries associated with an autonomous vehicle delivery service in accordance with one or more embodiments of the disclosed subject matter. In some embodiments, the server device 300 corresponds to a server device employed by the autonomous vehicle service management system 104 to facilitate providing and managing an autonomous vehicle delivery service in accordance with the security techniques described herein. In some implementations of these embodiments, the server device 300 can interface with the ordering system 102 and/or the security system 106 via suitable APIs for the respective systems to access and employ the respective ordering and security features of the corresponding systems. Additionally, or alternatively, the server device 300 can incorporate features and functionalities of the security system 106 via the security component 222. For example, as described above with reference to FIG. 2, the security component 222 can correspond to an autonomous vehicle authentication/verification software solution provided by the security system 106 that can be purchased or licensed by the autonomous vehicle service management system 104 from the security system 106 and executed locally by the autonomous vehicle service management system 104 server (i.e., server device 300). Still in other embodiments, the server device 300 can correspond to a universal server device that provides all of the features and functionalities of the ordering system 102 the autonomous vehicle service management system 104 and the security system 106. Various architectural configurations are envisioned. Repetitive description of like elements employed in respective embodiments is omitted for sake of brevity.

The server device 300 includes machine-executable components 301, storage 310, communication component 318, processing unit 320, memory 322, and a device bus 324 that couples the machine-executable components 301, the storage 310, the communication component 318, the processing unit 320 and the memory 322 to one another. In some embodiments, machine-executable components 301 can be stored in memory 322 and executed by processing unit 320 to cause the server device 300 to perform operations described with respect to the corresponding components. In this regard, the server device can correspond to any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies). Examples of said memory 322 and processing unit 320 as well as other suitable computer or computing-based elements, can be found with reference to FIG. 10 (e.g., processing unit 1004 and system memory 1006 respectively), and can be used in connection with implementing one or more of the systems or components shown and described in connection with FIG. 3, or other figures disclosed herein.

The storage 310 can store information that is received by, used by, and/or generated by the server device 300 in association with providing and managing the autonomous vehicle delivery service in accordance with the disclosed security techniques. In the embodiment, shown, this information includes (but is not limited to), customer data 312, service order data 314 and vehicle data 316. The storage 310 can correspond to any suitable machine-readable media that can be accessed by the server device 300 and includes both volatile and non-volatile media, removable and non-removable media implemented in any method or technology for storage of information, such as computer-readable instructions, data structures, models, algorithms, program modules, or other data. Computer storage media can include, but is not limited to, random access memory (RAM), read only memory (ROM), erasable programmable read only memory (EPROM), flash memory or other memory technology, digital video disk (DVD) or other optical disk storage, magnetic cassettes, magnetic tape, magnetic disk storage or other magnetic storage devices, or any other medium which can be used to store the desired information and which can be accessed by the server device 300.

The communication component 318 can correspond to any suitable communication technology hardware and/or software that can perform wired and/or wireless communication of data between the server device 300 and other systems and devices. In this regard, the communication component 310 can provide for communicating information between the server device 300 and respective autonomous vehicles (e.g., autonomous vehicle 118) managed by the autonomous vehicle service management system 104, respective local network devices associated with pick-up and drop-off locations, and user equipment associated with customers, IoT device and other communication devices. Examples of suitable communication technology hardware and/or software employable by the communication component 318 are described infra with reference to FIG. 10.

The machine-executable components 112 can include registration component 302, security component 222, order component 304, vehicle scheduling component 306 and tracking component 308. The registration component 302 can facilitate registering customers with the autonomous vehicle delivery service, as described with reference to the onboarding steps 201 and 202 in accordance with process 200. The customers can include any entity associated with a physical location having a corresponding address where a product (or another item or person) can be picked-up and/or dropped off by an autonomous vehicle. In this regard, the customers can include merchants and customers of the merchants as well as various other types of entities. In various implementations, merchants can pre-register with the autonomous vehicle delivery service in association with offering the service as a delivery option to customers. Customers can also pre-register for the autonomous vehicle delivery service and establish corresponding accounts, register in association with their first delivery order, or provide the associated registration information each time they request a delivery order. The customer data 312 can include account information for all customers (e.g., merchants and customers of the merchants). The account information for each customer can include information identifying one or more physical addresses associated with the customer where products can be pick-up and/or delivered by an autonomous vehicle. For each address, the account information can further include the requisite authorization data, comprising the access information (e.g., Wi-Fi network name and password) for the LAN associated with each address. In some embodiments, the authorization data can comprise additional authorization/verification parameters and instructions for authorizing/verifying pick-ups and deliveries at the corresponding address by an autonomous vehicle. As described above, the additional authorization/verification parameters and instructions can relate to verifying a pick-up or drop-off based on various criteria, including but not limited to: verification of a unique identifier for the local network device (e.g., local network device 112, local network device 116), successful performance of a bi-directional key exchange authorization protocol via the established communication link between the vehicle and the local network device, accessing and/or remotely controlling, by the autonomous vehicle, a function of a local IoT device connected to the LAN (e.g., ringing an IoT doorbell), and verification of a match between reference image data associated the address and current image data capture at the address by the autonomous vehicle (e.g., using an onboard camera).

In various embodiments, the consumer (i.e., the merchant associated with the pick-up location and the customer associated with the drop-off location) can define the specific authentication factor or combination of factors required for a specific address and/or order. In this regard, the consumer can control the level of security desired for a pick-ups and/or deliveries by an autonomous vehicle at the address (e.g., basic as function of verification in response to successful connection of the vehicle to the LAN using the corresponding access information, or a more heightened multi-factor authentication). In some embodiments, the level of security can be controlled as a function of the product or products associated with an order (e.g., more expensive or sensitive product orders can require a higher level of security relative to less expensive product orders, or the like).

The order component 304 can receive delivery orders for performance by the autonomous vehicle delivery service (e.g., from the ordering system 102 as described with reference to 203 and 204 in process 200). Based on reception of a delivery order the order component can identify the pick-up address, the drop-off address and the corresponding authentication/verification information associated with the respective addresses (e.g., as included in the customer data 312 and/or provided with the order. The vehicle scheduling component 306 can further select, assign and schedule an autonomous vehicle to perform the pick-up and delivery for the order, as described with reference to 205 in process 200. Information regarding the status, location and availability of respective autonomous vehicles in the fleet that can be scheduled for a delivery order can be included in the vehicle data 316.

In association with scheduling the vehicle, the scheduling component can provide the autonomous vehicle with the pick-up address, the authorization/verification instructions and associated data needed to perform verify the pick-up (e.g., the LAN access information, the private keys for a key exchange if applicable, the local network device identifier, the reference image data, etc.), the product or product order number, the drop-off address, and the authorization/verification instructions and associated data needed to perform verify the drop-off. In some embodiments in which a key exchange protocol is required for verifying a pick-up and/or drop-off, the security component 222 can generate the key data and provide the key data to the autonomous vehicle and the corresponding local network device at the time of scheduling of the vehicle. In other implementations of these embodiments, the local network device can maintain the same private key for authorizing pick-ups and/or deliveries for a defined duration of time. For example, the local network device may reuse the same private key data for multiple pick-ups/deliveries, be provided with updated key data once a week, or the like, to further enhance the security.

The tracking component 308 can further log all received delivery service orders (e.g., in the service order data 314). The tracking component 308 can further track and log information regarding whether verified pick-ups and drop-offs were completed for each service order in the service order data 314.

Figure 4:
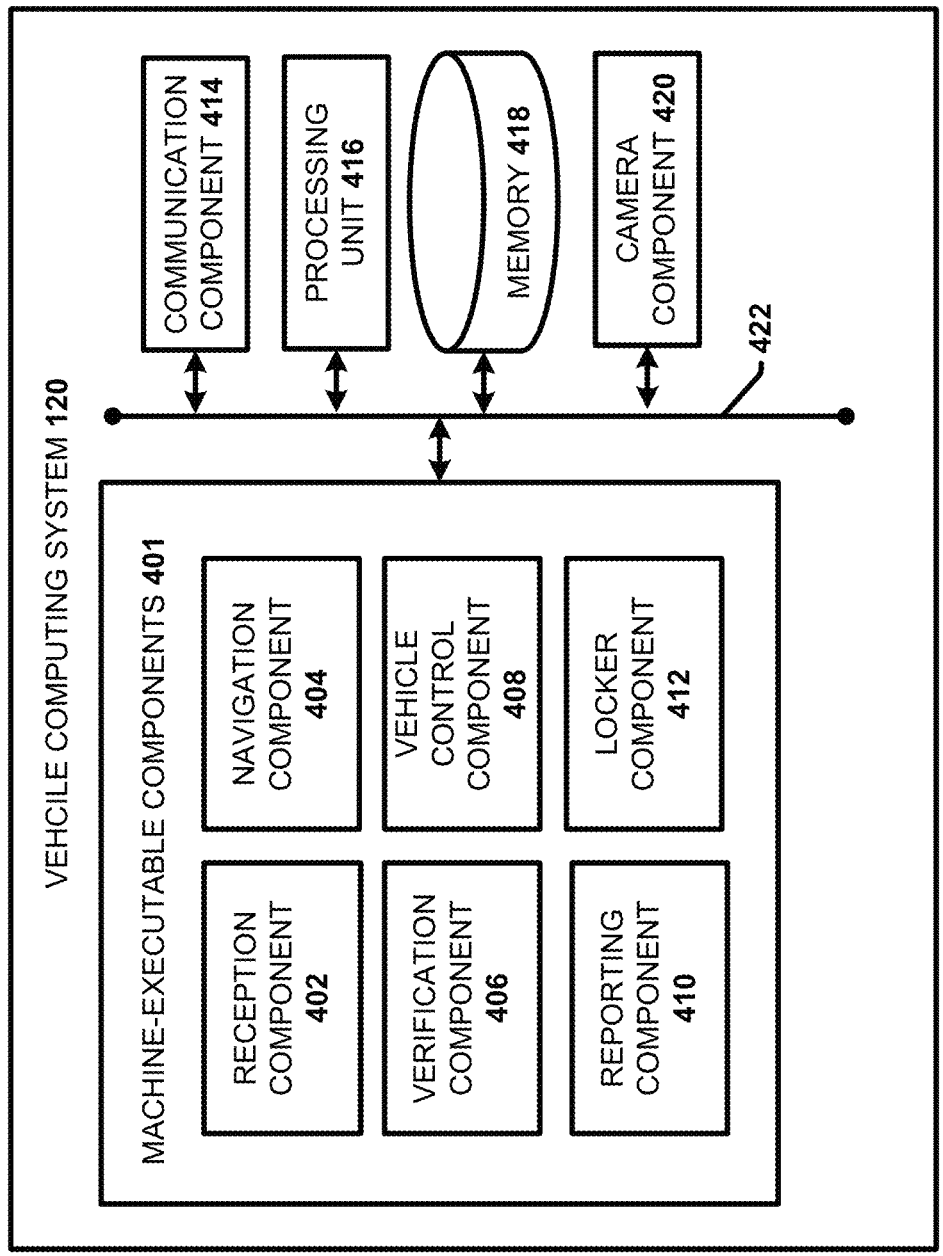
FIG. 4 illustrates a block diagram of an example, non-limiting vehicle computing system that facilitates authenticating and verifying pick-ups and deliveries associated with an autonomous vehicle delivery service in accordance with one or more embodiments of the disclosed subject matter.

FIG. 4 illustrates a block diagram of an example, non-limiting vehicle computing system 120 of an autonomous vehicle 118 that facilitates authenticating and verifying pick-ups and deliveries associated with an autonomous vehicle delivery service in accordance with one or more embodiments of the disclosed subject matter. Repetitive description of like elements employed in respective embodiments is omitted for sake of brevity.

The vehicle computing system 120 includes machine-executable components 401, communication component 414, processing unit 416, memory 418, camera component 420 and system bus 422 that couples the machine-executable components 401, the communication component 414, the processing unit 416, the memory 418, and the camera component 420 to one another. In some embodiments, machine-executable components 401 can be stored in memory 418 and executed by processing unit 416 to cause the vehicle computing system 120 to perform operations described with respect to the corresponding components. In this regard, the vehicle computing system can correspond to any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies). Examples of said memory 418 and processing unit 416 as well as other suitable computer or computing-based elements, can be found with reference to FIG. 10 (e.g., processing unit 1004 and system memory 1006 respectively), and can be used in connection with implementing one or more of the systems or components shown and described in connection with FIG. 4, or other figures disclosed herein.

The communication component 414 can correspond to any suitable communication device comprising communication technology hardware and/or software that can perform wireless communication of data between the vehicle computing system 120 and other systems and devices. In this regard, the communication component 414 can provide for communicating information between the server device 300 and the vehicle computing system 120, connecting to local network devices associated with pick-up and drop-off locations (e.g., local network device 112, local network device 116 and the like) using the corresponding LAN access information, communicating with user equipment associated with customers, IoT device and other communication devices. Examples of suitable communication technology hardware and/or software employable by the communication component 414 are described infra with reference to FIG. 10.

The camera component 420 can correspond to one or more cameras located on or within the autonomous vehicle 118. In some embodiments, the camera component 420 can be activated and controlled by the verification component 406 to control capture of image data of a current location of the vehicle in association with matching the current image data with reference image data for a pick-up location or drop-off location in association with verifying the pick-up or drop-off. With these embodiments, the verification component 406 can employ suitable image processing technology adapted to compare image data and determine whether two or more images sufficiently correspond to one another to constitute a match for verification purposes.

The machine-executable components 401 can include interface component 402, navigation component 404, verification component 406, vehicle control component 408, reporting component 410 and locker component 412. The interface component 402 can interface with the autonomous vehicle service management system 104 to access or otherwise receive pick-up and/or delivery service orders scheduled for performance by the autonomous vehicle. As described above, in association with receiving the scheduled service order, the reception component can receive the pick-up address, the authorization/verification instructions and associated data needed to perform verify the pick-up (e.g., the LAN access information, the private keys for a key exchange if applicable, the local network device identifier, the reference image data, etc.), the product or product order number, the drop-off address, and the authorization/verification instructions and associated data needed to perform verify the drop-off. In some embodiments, the vehicle computing system 120 can store any received information in memory 418. The navigation component 404 can facilitate self-navigating the autonomous vehicle to the pick-up address and the drop-off address associated with a delivery service order using GPS navigation technology and/or other existing navigation/positioning technology.

The verification component 406 can perform the authentication/verification processes required to verify the pick-up and/or the drop-off once the current GPS location of the vehicle indicates the vehicle has arrived at the pick-up address and drop-off address respectively. In this regard, the verification component 406 can direct the communication component 414 to connect with the LAN associated with target location (i.e., the pick-up address or the drop-off address) using the network access information associated with the target location received by the reception component. In embodiments in which additional authentication/verification criterion are required for the target location, the verification component 406 can control performing the corresponding verification/authentication protocols in association with verifying the pick-up and/or the drop-off. For example, the verification component 406 can direct the local network device to provide its device identifier for verification (if required), control performance of the key exchange authorization protocol with the local network device in association with verifying the pick-up or drop-off, control remotely accessing and activating an IoT device at the target location in association with connection to the LAN, and so on. In this regard, the verification component 406 can determine whether the current location of the vehicle corresponds to the target location and whether the additional verification criteria for a pick-up or drop-off are satisfied.

The vehicle control component 408 can control access to the autonomous vehicle as a function of a result of the verification processes. In some embodiments, based on successful verification/authorization of a pick-up and/or delivery, the vehicle control component 408 can open the vehicle and/or an area of the vehicle for placing an order/product and/or retrieving the order/product. In some embodiments, the autonomous vehicle 118 can include a plurality of locker units for placing products. With these embodiments, the locker component 412 can assign an available locker unit to an order for a product and the vehicle control component 408 can control access to the locker unit as a function of the verification process. For example, based on successful verification of a pick-up location for a product, the vehicle control component 408 can open the locker for the placement of the product at the pick-up location and/or the locker component 412 can provide an entity at the pick-up location with the locker access code (or another form of locker access information) for opening the locker to place the product therein (e.g., in the form of an electronic communication sent to a communication device associated with the entity via the communication component 414). Likewise, based on successful verification of the drop-off location for the product, the vehicle control component 408 can open the locker for retrieving the product at the drop-off location and/or the locker component 412 can provide an entity at the drop-off location with the locker access code (or another form of locker access information) for opening the locker to retrieve the product therein (e.g., in the form of an electronic communication sent to a communication device associated with the entity via the communication component 414).

The reporting component 410 can further report information (e.g., in the form of notification messages or the like) back to the autonomous vehicle service management system 104 (e.g., server device 300) regarding successful and unsuccessful verifications of pick-ups and drop-offs by the autonomous vehicle 118.

Figure 5:
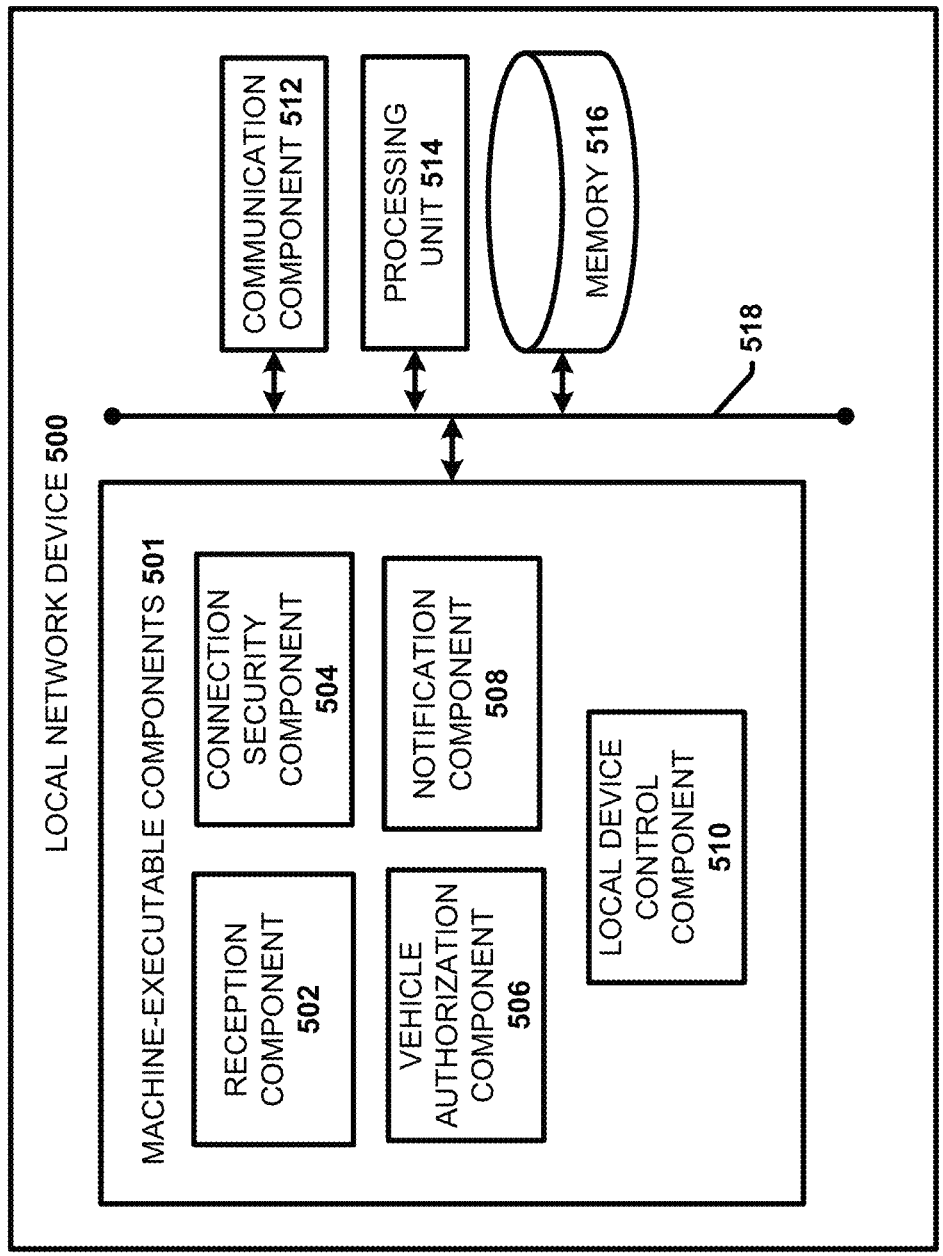
FIG. 5 illustrates a block diagram of an example, non-limiting local network device that facilitates authenticating and verifying pick-ups and deliveries associated with an autonomous vehicle delivery service in accordance with one or more embodiments of the disclosed subject matter.

FIG. 5 illustrates a block diagram of an example, non-limiting local network device 500 that facilitates authenticating and verifying pick-ups and deliveries associated with an autonomous vehicle delivery service in accordance with one or more embodiments of the disclosed subject matter. In some embodiments, the local network device 500 can correspond to local network device 112 and/or local network device 116. Repetitive description of like elements employed in respective embodiments is omitted for sake of brevity.

The local network device 500 includes machine-executable components 501, communication component 512, processing unit 514, memory 516, and device bus 518 that couples the machine-executable components 501, the communication component 512, the processing unit 514, and the memory 516, to one another. In some embodiments, machine-executable components 501 can be stored in memory 516 and executed by processing unit 514 to cause the local network device 500 to perform operations described with respect to the corresponding components. Examples of said memory 516 and processing unit 414 as well as other suitable computer or computing-based elements, can be found with reference to FIG. 10 (e.g., processing unit 1004 and system memory 1006 respectively), and can be used in connection with implementing one or more of the systems or components shown and described in connection with FIG. 5, or other figures disclosed herein.

The communication component 512 can correspond to any suitable communication device comprising communication technology hardware and/or software that can perform wireless communication of data between the local network device 500 and the vehicle computing system 120 and that can perform wired and/or wireless communications with other systems and devices (e.g., the server device 300, other devices connected to the LAN and/or the communication network 108, etc.). Examples of suitable communication technology hardware and/or software employable by the communication component 512 are described infra with reference to FIG. 10.

The machine-executable components 401 can include reception component 502, connection security component 504, vehicle authorization component 506, notification component 508 and local device control component 510. The connection security component 504 can control establishing a valid wireless connection link with the local network device by an autonomous vehicle based on provision of the correct network access information (e.g., the password or the like) for the LAN managed by the local network device 500. The vehicle authorization component 506 can perform any additional authorization/verification steps associated with the local network device 500 in association with authorizing an autonomous vehicle pick-up or delivery at the corresponding location where the local network device 500 is deployed. In this regard, the vehicle authorization component 506 can communicate with the verification component 406 in association with exchanging information (e.g., device identifiers, private keys, confirmation messaging indicating authorization/verification is successful or not, etc.) associated with the additional authorization/verification steps once a wireless connection has been successfully established between the autonomous vehicle and the local network device 500.

In some embodiments, the reception component 502 can receive authorization/verification information from the server device 300 to be used by the local network device 500 (or more particularly vehicle authorization component 506) in association with authorizing/verifying a pick-up or delivery by an autonomous vehicle. For example, in some implementations, the authorization/verification information can include key data corresponding to one or more private keys, generated by the security component 222, to be used by the vehicle authorization component 506 in association with authorizing an autonomous vehicle pick-up or delivery in accordance with a bi-directional key exchange protocol. Any information received by the local network device 500 from the server device 300 (e.g., key data) can be stored in memory 516. In some implementations, the key data can expire after a defined amount of time (e.g., 24 hours, one week, etc.) and/or occurrence of a defined event (e.g., a verified pick-up or delivery).

The notification component 508 can provide notifications to external device connected to the local network device 500 regarding pick-ups and deliveries, such as user equipment associated with users/entities at the corresponding location. The local device control component 510 can facilitate remotely controlling, by the autonomous vehicle 118, one or more local devices (e.g., IoT devices or the like) connected to the LAN. For example, after the autonomous vehicle has established a valid connection with the local network device 500, the local device control component 510 can relay control signals received from the autonomous vehicle directed to one or more IoT devices connected wo the LAN by the vehicle computing system 120 and the verification component 406.

Figure 6:
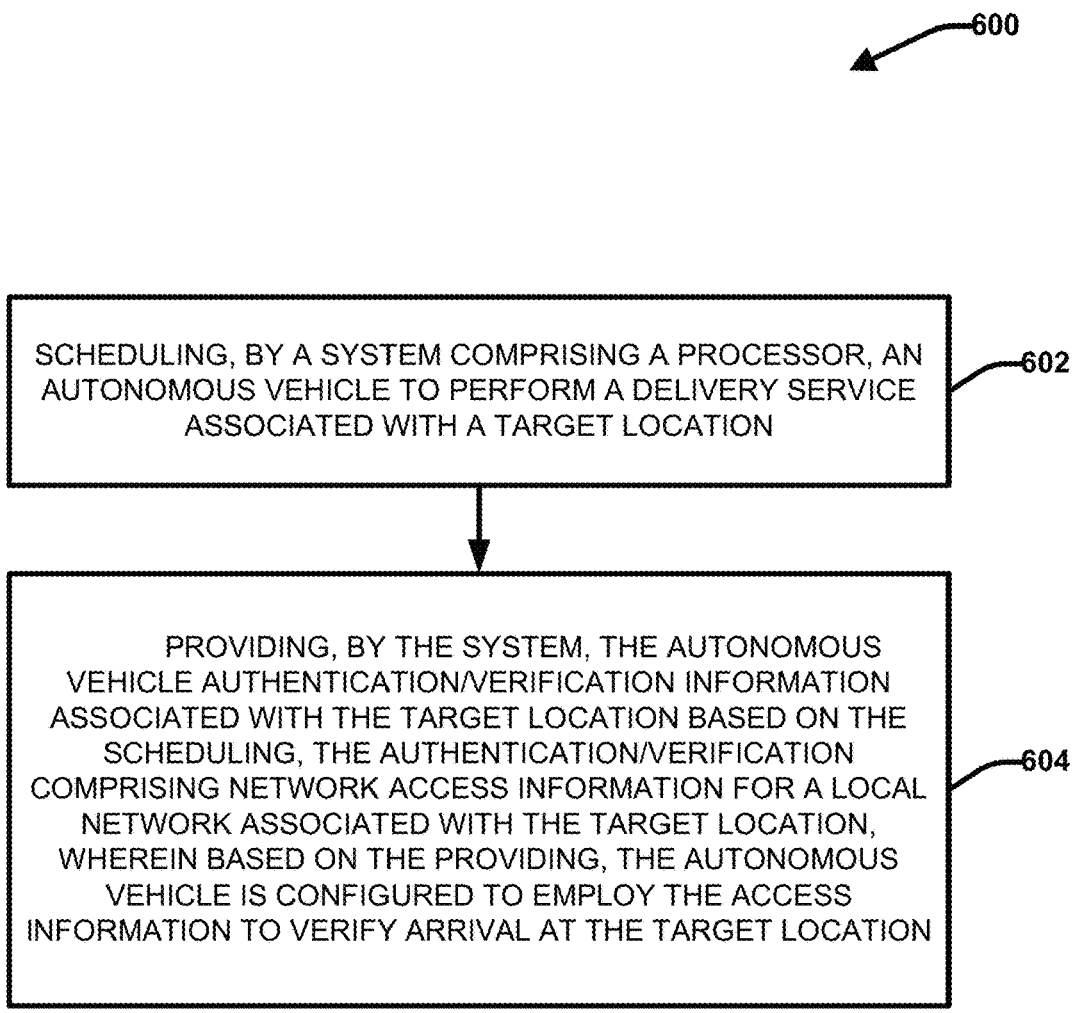
FIG. 6 illustrates a block diagram of an example, non-limiting computer implemented method for authenticating and verifying pick-ups and deliveries associated with an autonomous vehicle delivery service in accordance with one or more embodiments of the disclosed subject matter.

FIG. 6 illustrates a block diagram of an example, non-limiting computer implemented method 600 for authenticating and verifying pick-ups and deliveries associated with an autonomous vehicle delivery service in accordance with one or more embodiments of the disclosed subject matter. In some implementations, method 600 corresponds to an example method that can be performed by the autonomous vehicle service management system 104 using server device 300. Repetitive description of like elements employed in respective embodiment is omitted for sake of brevity.

Method 600 comprises, at 602, scheduling (e.g., via vehicle scheduling component 308), by a system comprising a processor (e.g., autonomous vehicle service management system 104 and/or server device 300), an autonomous vehicle (e.g., autonomous vehicle 118) to perform a delivery service associated with a target location (e.g., a pick-up location and/or a drop-off location). At 604, method 600 further comprises providing, by the system (e.g., via scheduling component 308 and/or communication component 318), the autonomous vehicle authentication/verification information associated with the target location based on the scheduling, the authentication/verification comprising network access information for a local network associated with the target location, wherein based on the providing, the autonomous vehicle is configured to employ the access information to verify arrival at the target location.

Figure 7:
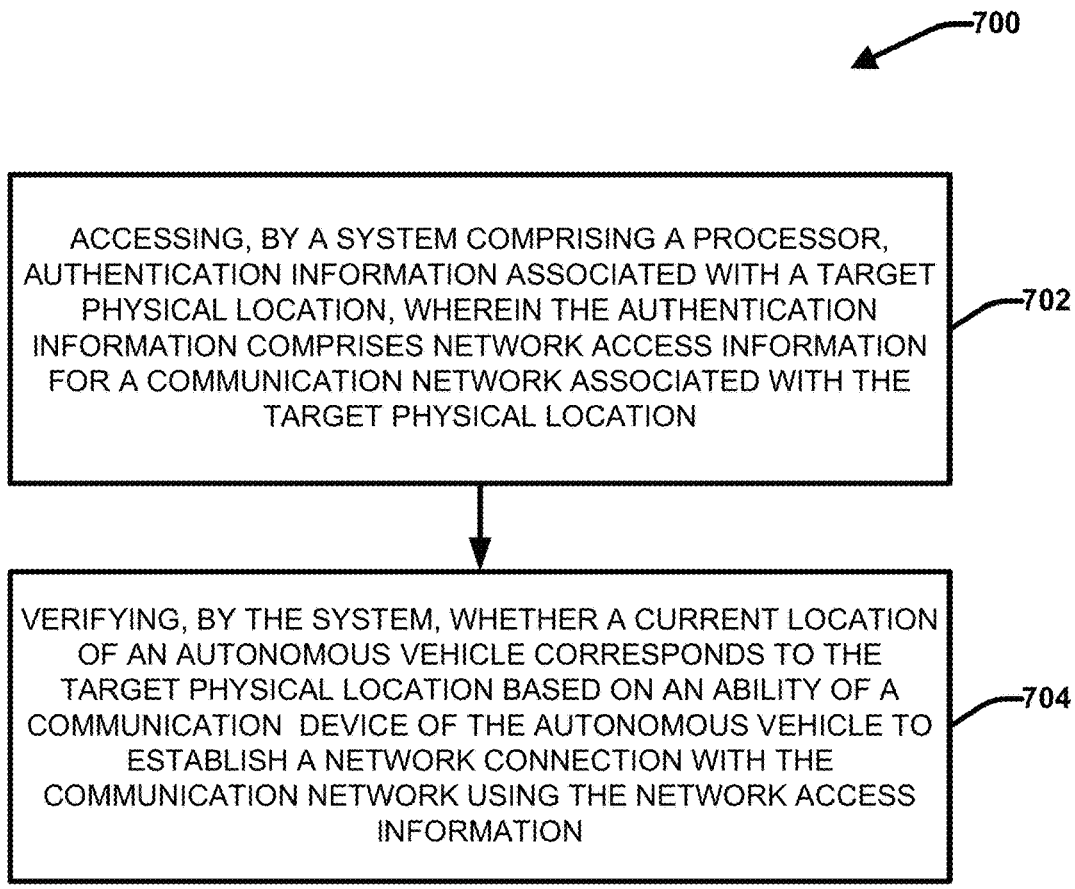
FIG. 7 illustrates a block diagram of another example, non-limiting computer implemented method for authenticating and verifying pick-ups and deliveries associated with an autonomous vehicle delivery service in accordance with one or more embodiments of the disclosed subject matter.

FIG. 7 illustrates a block diagram of an example, non-limiting computer implemented method 700 for authenticating and verifying pick-ups and deliveries associated with an autonomous vehicle delivery service in accordance with one or more embodiments of the disclosed subject matter. In some implementations, method 700 corresponds to an example method that can be performed by a vehicle computing system 120 of an autonomous vehicle 118. Repetitive description of like elements employed in respective embodiment is omitted for sake of brevity.

Method 700 comprises, at 702, accessing, by a system comprising a processor (e.g., vehicle computing system 120), authentication information associated with a target physical location (e.g., using interface component 402), wherein the authentication information comprises network access information for a communication network associated with the target physical location (e.g., a communication network associated with local network device 112 and pick-up location 110 and/or a communication network associated with local network device 116 and drop off-location 114). At 704, method 700 further comprises verifying, by the system (e.g., via verification component 406), whether a current location of an autonomous vehicle corresponds to the target physical location based on an ability of a communication device of the autonomous vehicle (e.g., communication component 414) to establish a network connection with the communication network using the network access information.

Figure 8:
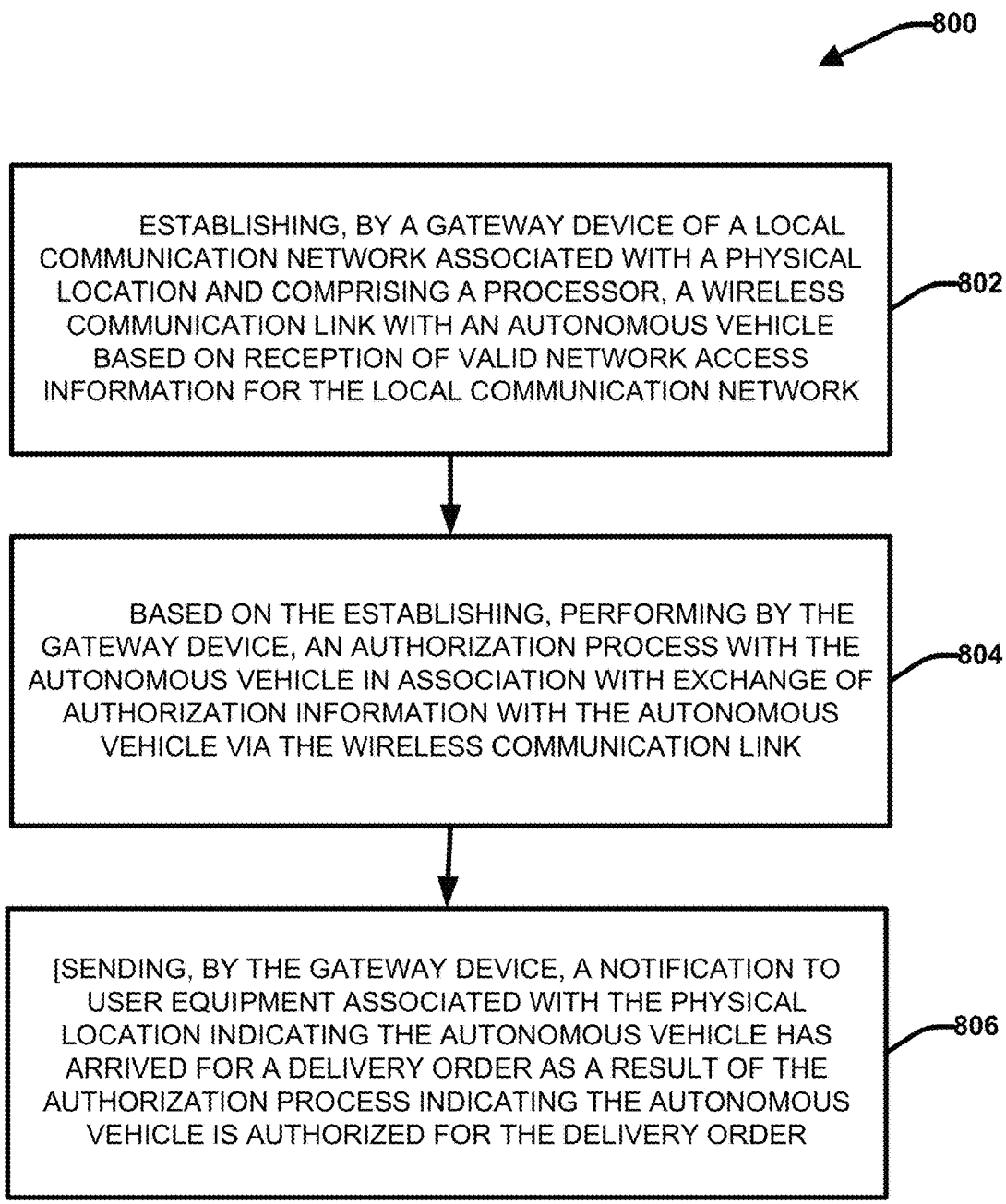
FIG. 8 illustrates a block diagram of another example, non-limiting computer implemented method for authenticating and verifying pick-ups and deliveries associated with an autonomous vehicle delivery service in accordance with one or more embodiments of the disclosed subject matter.

FIG. 8 illustrates a block diagram of an example, non-limiting computer implemented method 800 for authenticating and verifying pick-ups and deliveries associated with an autonomous vehicle delivery service in accordance with one or more embodiments of the disclosed subject matter. In some implementations, method 800 corresponds to an example method that can be performed by a local network device associated with a pick-up location or a drop-off location (e.g., local network device 500 corresponding to local network device 112 and/or local network device 116). Repetitive description of like elements employed in respective embodiment is omitted for sake of brevity.

Method 800 comprises, at 802, establishing, by a gateway device of a local communication network associated with a physical location and comprising a processor (e.g., local network device 500 corresponding to local network device 112 and/or local network device 116) a wireless communication link with an autonomous vehicle (e.g., autonomous vehicle 118) based on reception of valid network access information for the local communication network. At 804, method 800 comprises, based on the establishing, performing by the gateway device, an authorization process with the autonomous vehicle in association with exchange of authorization information with the autonomous vehicle via the wireless communication link (e.g., via vehicle authorization component 506). At 806, method 800 further comprises, sending, by the gateway device, a notification to user equipment associated with the physical location indicating the autonomous vehicle has arrived for a delivery order as a result of the authorization process indicating the autonomous vehicle is authorized for the delivery order (e.g., via notification component 508).

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
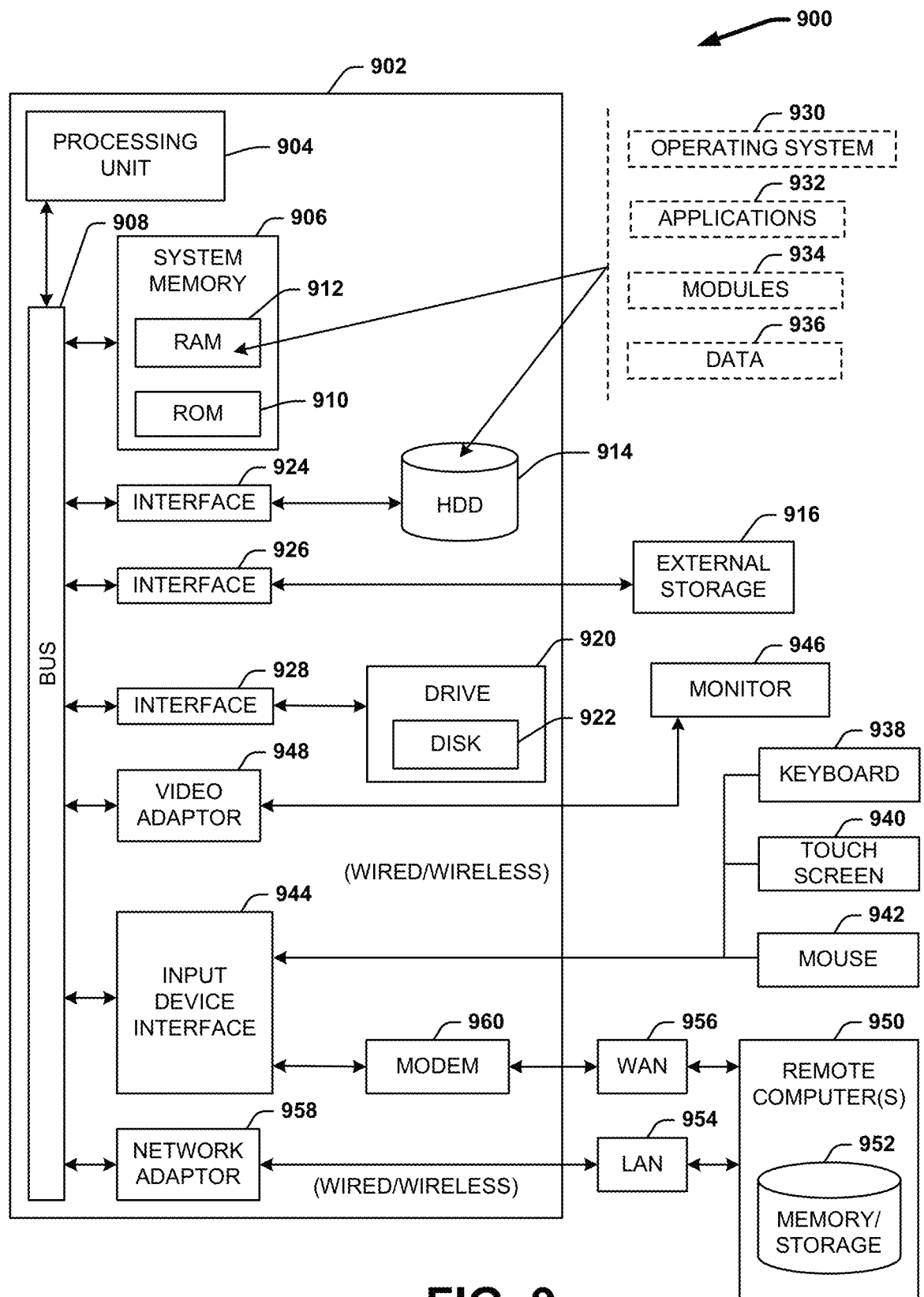
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 10:
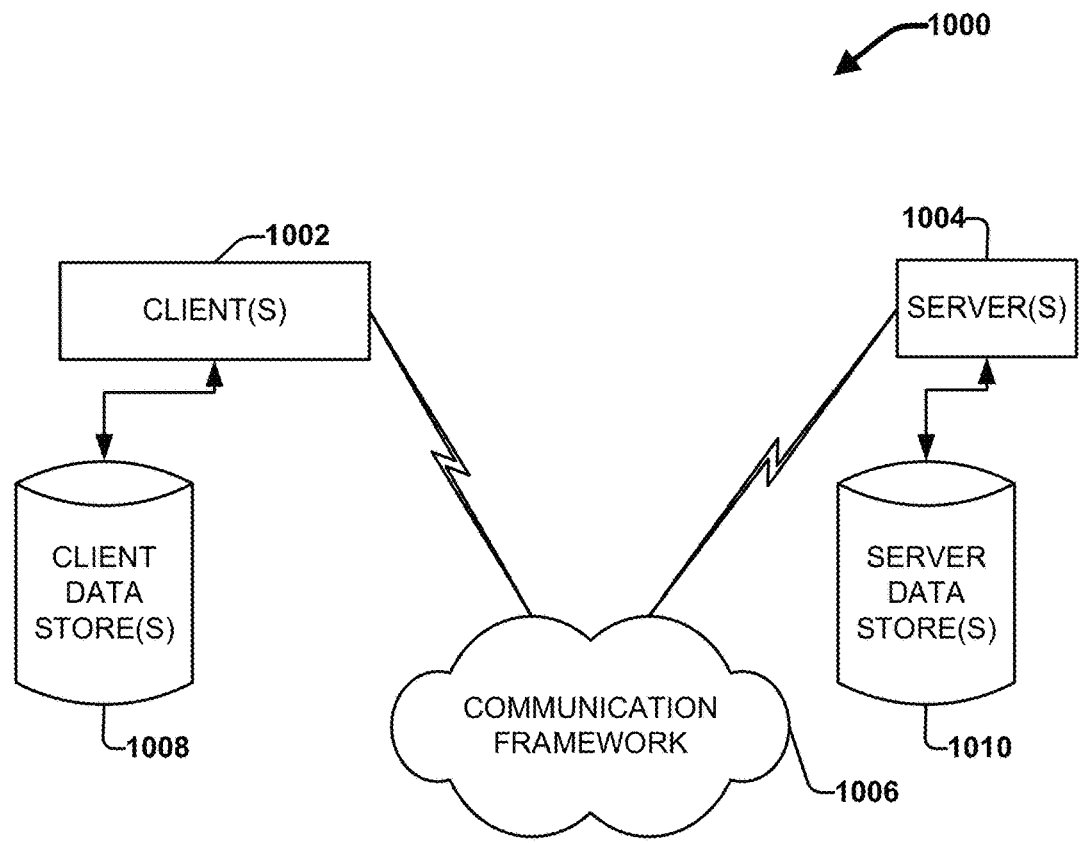
FIG. 10 illustrates a block diagram of another example, non-limiting operating environment in which one or more embodiments described herein can be facilitated.

Referring to FIG. 10, there is illustrated a schematic block diagram of a computing environment 1000 in accordance with this disclosure in which the subject systems (e.g., system 100 and the like), methods and computer readable media can be deployed. The computing environment 1000 includes one or more client(s) 1002 (e.g., laptops, smart phones, PDAs, media players, computers, portable electronic devices, wearable devices, tablets, and the like). The client(s) 1002 can be hardware and/or software (e.g., threads, processes, computing devices). The computing environment 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. In various embodiments, one or more components, devices, systems, or subsystems of computing device 101, system 200 and computing device 501 can be deployed as hardware and/or software at a client 1002 and/or as hardware and/or software deployed at a server 1004. One possible communication between a client 1002 and a server 1004 can be in the form of a data packet transmitted between two or more computer processes wherein the data packet may include order information for an autonomous vehicle delivery order, authentication/verification information associated with the order, and the like. The data packet can include a metadata, e.g., associated contextual information, for example. The computing environment 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002. Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 can compress the file in accordance with the disclosed subject matter. Likewise, server 1004 can encode video information and transmit the information via communication framework 1006 to one or more clients 1002.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and a memory that stores executable instructions that, when executed by the processor, facilitate performance of operations, comprising:
  accessing authentication information associated with a target physical location, wherein the authentication information comprises network access information for a communication network associated with the target physical location;
  verifying whether a current location of an autonomous vehicle corresponds to the target physical location based on an ability of a communication device of the autonomous vehicle to establish a network connection with the communication network using the network access information;
  providing an access code to a local device at the target physical location responsive to the verifying that the current location of the autonomous vehicle corresponds to the target physical location, wherein the access code is associated with a first storage locker of a plurality of storage lockers at the autonomous vehicle; and
  remotely controlling an action of the local device at the target physical location via the communication network according to the network connection to verify completion of a pickup or delivery associated with the autonomous vehicle at the target physical location.

2. The system of claim 1, wherein the authentication information specifies the action to be performed by the local device at the target physical location.

3. The system of claim 1, wherein the target physical location is associated with a pick-up location for a pick-up of a product, and wherein the accessing the authentication information is based on reception of an order for the product to be picked up by the autonomous vehicle.

4. The system of claim 3, wherein, based on a result of the verifying being that the current location of the autonomous vehicle corresponds to the target physical location, the operations further comprise:
  enabling physical access by the local device to the first storage locker of the plurality of storage lockers at the autonomous vehicle for placement of the product in connection with the pick-up of the product according to the access code.

5. The system of claim 1, wherein the target physical location corresponds to a drop-off location for a drop-off of a product, and wherein the accessing is based on reception of an order for the product to be delivered to the drop-off location by the autonomous vehicle.

6. The system of claim 5, wherein based on a result of the verifying being that the current location of the autonomous vehicle corresponds to the target physical location, the operations further comprise:
  enabling physical access by the local device to the first storage locker of the plurality of storage lockers at the autonomous vehicle comprising the product in connection with the drop-off of the product.

7. The system of claim 1, wherein the authentication information further comprises criterion information that identifies a verification criterion associated with the target physical location, and wherein the verifying is further based on whether the verification criterion is satisfied.

8. The system of claim 7, wherein satisfaction of the verification criterion comprises an authentication of a gateway device associated with the target physical location using private key data for the gateway device included in the authentication information.

9. The system of claim 7, wherein satisfaction of the verification criterion comprises a successful completion of an authentication protocol between the device and a gateway device associated with the target physical location using private key data for the gateway device included in the authentication information.

10. The system of claim 7, wherein the authentication information comprises reference image data associated with the target physical location, and wherein satisfaction of the verification criterion comprises determining there is a match between the reference image data and current image data captured at the current location by the autonomous vehicle.

11. The system of claim 7, wherein satisfaction of the verification criterion varies for different target physical locations comprising the target physical location.

12. The system of claim 7, wherein the target physical location is associated with a pick-up location or a drop-off location for a product to be delivered by the autonomous vehicle in association with an order for the product, and wherein the verification criterion varies based on a first characteristic of the order or a second characteristic of an entity associated with the order.

13. A method, comprising:
  accessing, by a system comprising a processor, authentication information associated with a target physical location, wherein the authentication information comprises network access information for a communication network associated with the target physical location;
  verifying, by the system, whether a current location of an autonomous vehicle corresponds to the target physical location based on an ability of a communication device of the autonomous vehicle to establish a network connection with the communication network using the network access information; and
  providing, by the system, an access code to a local device at the target physical location responsive to the verifying that the current location of the autonomous vehicle corresponds to the target physical location, wherein the access code is associated with a first storage locker of a plurality of storage lockers at the autonomous vehicle; and
  remotely controlling, by the system, an action of the local device at the target physical location via the communication network according to the network connection to verify completion of a pickup or delivery associated with the autonomous vehicle at the target physical location.

14. The method of claim 13, further comprising:
  assigning, by the system, the first storage locker of the plurality of storage lockers at the autonomous vehicle to an order for a product associated with the target physical location.

15. The method of claim 13, wherein the target physical location is associated with a pick-up location for a pick-up of a product, wherein the accessing the authentication information is based on reception of an order for the product to be picked up by the autonomous vehicle, and wherein based on a result of the verifying being that the current location of the autonomous vehicle corresponds to the target physical location, the method further comprising:
  enabling, by the system, physical access by the local device to the first storage locker of the plurality of storage lockers at the autonomous vehicle for placement of the product in connection with the pick-up of the product according to the access code.

16. The method of claim 15, wherein the target physical location corresponds to a drop-off location for a drop-off of a product, and wherein the accessing the authentication information is based on reception of an order for the product to be delivered to the drop-off location by the autonomous vehicle, and wherein based on a result of the verifying being that the current location of the autonomous vehicle corresponds to the target physical location, the method further comprising:
- enabling, by the system, physical access by the local device to the first storage locker of the plurality of storage lockers at the autonomous vehicle comprising the product in connection with the drop-off of the product.

17. The method of claim 13, wherein the authentication information further comprises criterion information that identifies a verification criterion associated with the target physical location, and wherein the verifying is further based on whether the verification criterion is satisfied.

18. The method of claim 17, wherein satisfaction of the verification criterion comprises an authentication of a gateway device associated with the target physical location using private key data for the gateway device included in the authentication information.

19. A non-transitory machine-readable medium, comprising executable instructions that, when executed by a processor, facilitate performance of operations, comprising:
- accessing authentication information associated with a target physical location, wherein the authentication information comprises network access information for a communication network associated with the target physical location;
- verifying whether a current location of an autonomous vehicle corresponds to the target physical location based on an ability of a communication device of the autonomous vehicle to establish a network connection with the communication network using the network access information; and
- providing an access code to a local device at the target physical location responsive to the verifying that the current location of the autonomous vehicle corresponds to the target physical location, wherein the access code is associated with a first storage locker of a plurality of storage lockers at the autonomous vehicle; and
- remotely controlling an action of the local device at the target physical location via the communication network according to the network connection to verify completion of a pickup or delivery associated with the autonomous vehicle at the target physical location.

20. The non-transitory machine-readable medium of claim 19, wherein the operations further comprise:
- assigning the first storage locker of the plurality of storage lockers at the autonomous vehicle to an order for a product associated with the target physical location.

* * * * *